United States Patent
Gup et al.

(10) Patent No.: US 10,474,342 B2
(45) Date of Patent: Nov. 12, 2019

(54) SCROLLABLE USER INTERFACE CONTROL

(71) Applicant: Microsoft Technology Licensing, LLC, Redmond, WA (US)

(72) Inventors: Jeremy Gup, Seattle, WA (US); Matt Coill, Duvall, WA (US); Dean Rowe, Bellevue, WA (US); Richard Sauer, Redmond, WA (US); Paul Byrne, Seattle, WA (US); Emily Zu-ping Yan, Mercer Island, WA (US); Joe Chauvin, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 243 days.

(21) Appl. No.: 13/717,138

(22) Filed: Dec. 17, 2012

(65) Prior Publication Data
US 2014/0173504 A1 Jun. 19, 2014

(51) Int. Cl.
G06F 3/0485 (2013.01)
G06F 3/00 (2006.01)
G06F 3/01 (2006.01)

(52) U.S. Cl.
CPC ............ G06F 3/0485 (2013.01); G06F 3/005 (2013.01); G06F 3/011 (2013.01); G06F 3/017 (2013.01)

(58) Field of Classification Search
CPC ........ G06F 3/017; G06F 3/011; G06F 3/0485; G06F 3/005

USPC ........ 715/784–787, 828–832, 815, 856–862, 715/826, 863; 345/157; 382/154; 725/52

See application file for complete search history.

(56) References Cited

U.S. PATENT DOCUMENTS

| | | | | |
|---|---|---|---|---|
| 5,528,260 | A * | 6/1996 | Kent | 345/684 |
| 5,594,469 | A * | 1/1997 | Freeman et al. | 345/158 |
| 5,726,687 | A * | 3/1998 | Belfiore et al. | 715/785 |
| 6,067,069 | A * | 5/2000 | Krause | G06F 3/0481 345/685 |
| 6,157,381 | A * | 12/2000 | Bates et al. | 715/786 |
| 6,259,432 | B1 * | 7/2001 | Yamada | G06F 3/038 345/159 |
| 6,369,837 | B1 * | 4/2002 | Schirmer | 715/764 |

(Continued)

OTHER PUBLICATIONS

Fourney, Adam, "Design and Evaluation of a Presentation Maestro", Retrieved at <<http://www.adamfourney.com/papers/afourney_thesis_electronic.pdf>>, Retrieved Date: Sep. 24, 2012, pp. 109.

*Primary Examiner* — Andrew L Tank
(74) *Attorney, Agent, or Firm* — Alleman Hall Creasman & Tuttle LLP

(57) ABSTRACT

One example method for navigating a scrollable user interface includes outputting to a display device the scrollable user interface, the scrollable user interface including a scroll-control target. The method further includes receiving a pointer input, and moving a position of a virtual pointer on the scrollable user interface responsive to the pointer input. Responsive to the virtual pointer being within a first region of the scroll-control target, the scrollable user interface is scrolled at a first speed. Responsive to the virtual pointer being within a second region of the scroll-control target, the scrollable user interface is scrolled at a second speed, faster than the first speed.

20 Claims, 5 Drawing Sheets

(56) References Cited

U.S. PATENT DOCUMENTS

| | | | |
|---|---|---|---|
| 6,421,064 B1* | 7/2002 | Lemelson | G06F 3/013 345/688 |
| 6,721,953 B1 | 4/2004 | Bates et al. | |
| 6,747,680 B1* | 6/2004 | Igarashi et al. | 715/784 |
| 6,847,388 B2* | 1/2005 | Anderson | 715/854 |
| 6,975,306 B2* | 12/2005 | Hinckley et al. | 345/173 |
| 7,293,244 B2* | 11/2007 | Randall | 715/784 |
| 7,834,849 B2 | 11/2010 | Hunleth et al. | |
| 7,886,229 B2* | 2/2011 | Pachet | 715/726 |
| 8,245,255 B2 | 8/2012 | Schlarb | |
| 8,334,840 B2* | 12/2012 | Serafin et al. | 345/156 |
| 8,359,545 B2* | 1/2013 | Pixley et al. | 715/786 |
| 8,381,135 B2* | 2/2013 | Hotelling et al. | 715/863 |
| 8,659,548 B2* | 2/2014 | Hildreth | 345/158 |
| 2002/0084981 A1* | 7/2002 | Flack | G06F 3/04812 345/157 |
| 2002/0105482 A1* | 8/2002 | Lemelson | G06F 3/013 345/7 |
| 2002/0109728 A1* | 8/2002 | Tiongson et al. | 345/786 |
| 2006/0048071 A1* | 3/2006 | Jarrett et al. | 715/784 |
| 2007/0209017 A1* | 9/2007 | Gupta et al. | 715/781 |
| 2007/0273668 A1* | 11/2007 | Park | G06F 3/0485 345/173 |
| 2009/0007007 A1 | 1/2009 | Voros et al. | |
| 2009/0322676 A1* | 12/2009 | Kerr et al. | 345/158 |
| 2010/0070912 A1* | 3/2010 | Zaman | G06F 3/0481 715/784 |
| 2010/0153996 A1 | 6/2010 | Migos et al. | |
| 2010/0169362 A1* | 7/2010 | Bulfani et al. | 707/769 |
| 2011/0026765 A1 | 2/2011 | Ivanich et al. | |
| 2011/0055775 A1* | 3/2011 | Saito | G06F 3/0485 715/863 |
| 2011/0154266 A1* | 6/2011 | Friend et al. | 715/863 |
| 2011/0234635 A1* | 9/2011 | Utsuki | 345/647 |
| 2011/0289456 A1* | 11/2011 | Reville et al. | 715/830 |
| 2011/0310010 A1* | 12/2011 | Hoffnung et al. | 345/157 |
| 2011/0319138 A1* | 12/2011 | Noh | 455/566 |
| 2012/0030625 A1* | 2/2012 | Miyazaki | 715/830 |
| 2012/0092253 A1* | 4/2012 | Irani et al. | 345/157 |
| 2012/0169609 A1 | 7/2012 | Britton | |
| 2012/0240041 A1* | 9/2012 | Lim | G06F 3/0485 715/702 |
| 2013/0055150 A1* | 2/2013 | Galor | G09G 5/34 715/784 |
| 2013/0080976 A1* | 3/2013 | Zambrano | G06F 3/011 715/830 |

\* cited by examiner

SCROLLABLE USER INTERFACE CONTROL

BACKGROUND

Scrollable user interfaces, such as episodic program guides, may be configured to present a large amount of information to a user. Typically, only a portion of this large amount of information is displayed to the user at one time. To view a desired piece of information not currently displayed, the user may scroll through all the intervening information to reach the desired information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments for navigating a scrollable user interface are presented. One example method includes outputting to a display device the scrollable user interface, the scrollable user interface including a scroll-control target, receiving a pointer input, and moving a position of a virtual pointer on the scrollable user interface responsive to the pointer input. Responsive to the virtual pointer being within a first region of the scroll-control target, the scrollable user interface may be scrolled at a first speed. Responsive to the virtual pointer being within a second region of the scroll-control target, the scrollable user interface may be scrolled at a second speed, faster than the first speed.

DETAILED DESCRIPTION

Scrollable user interfaces may provide a platform for presenting information to a user in an easily digestible manner. For example, episodic program guides may present information regarding television programming available for current and future user consumption. A user may scroll through the scrollable user interface to reach a desired portion of the interface, for example to select a desired program. However, the number of television channels available to choose from coupled with the large time frame across which future programs are scheduled may result in a large amount of information through which the user may scroll in order to reach the desired portion of the interface.

Accordingly, a scrollable user interface may include one or more scroll control targets in which a virtual pointer may be placed. The position of the virtual pointer within the scroll control region may determine the speed at which the scrollable user interface is scrolled. Further, at relatively higher scroll speeds, the information presented by the scrollable user interface may be adjusted from a first, more detailed user interface (e.g., incremented by hour) presented at lower scroll speeds to a second, less detailed user interface (e.g., incremented by day) presented at higher scroll speeds. The virtual pointer may be controlled with natural user input (NUI) gestures and/or other suitable inputs. In this way, the virtual pointer may be positioned in the scroll control region to not only increase the scrolling speed of the scrollable user interface, but also to decrease the scrolling speed of the scrollable user interface to virtually any number of speeds between a slowest speed and a fastest speed.

Figure 1:
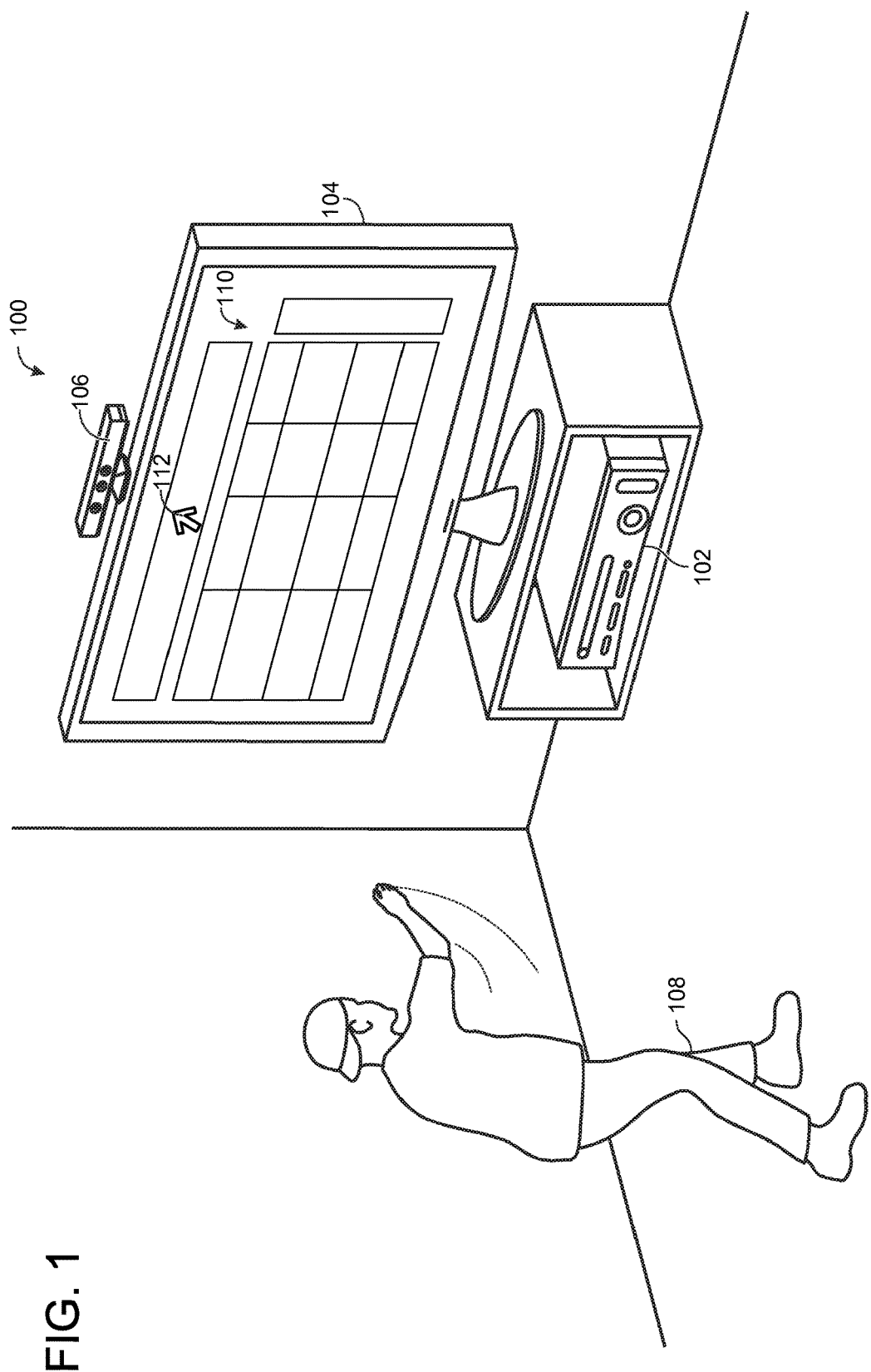
FIG. 1 schematically shows a non-limiting example of a control environment.

FIG. 1 shows a non-limiting example of a control environment 100. In particular, FIG. 1 shows an entertainment system 102 that may be used to play a variety of different games, play one or more different media types, and/or control or manipulate non-game applications and/or operating systems. FIG. 1 also shows a display device 104 such as a television or a computer monitor, which may be used to present media content, game visuals, etc., to users. As one example, display device 104 may be used to visually present media content received by entertainment system 102. In the example illustrated in FIG. 1, display device 104 is displaying a scrollable user interface 110 received from entertainment system 102 that, in one example, presents selectable information about media content received by entertainment system 102. The control environment 100 may include a capture device, such as a depth camera 106 that visually monitors or tracks objects and users within an observed scene.

Display device 104 may be operatively connected to entertainment system 102 via a display output of the entertainment system. For example, entertainment system 102 may include an HDMI or other suitable wired or wireless display output. Display device 104 may receive video content from entertainment system 102, and/or it may include a separate receiver configured to receive video content directly from a content provider.

The depth camera 106 may be operatively connected to the entertainment system 102 via one or more interfaces. As a non-limiting example, the entertainment system 102 may include a universal serial bus to which the depth camera 106 may be connected. Depth camera 106 may be used to recognize, analyze, and/or track one or more human subjects and/or objects within a physical space, such as user 108. Depth camera 106 may include an infrared light to project infrared light onto the physical space and a depth camera configured to receive infrared light.

Entertainment system 102 may be configured to communicate with one or more remote computing devices, not shown in FIG. 1. For example, entertainment system 102 may receive video content directly from a broadcaster, third party media delivery service, or other content provider. Entertainment system 102 may also communicate with one or more remote services via the Internet or another network, for example in order to analyze image information received from depth camera 106.

While the embodiment depicted in FIG. 1 shows entertainment system 102, display device 104, and depth camera 106 as separate elements, in some embodiments one or more of the elements may be integrated into a common device.

One or more aspects of entertainment system 102 and/or display device 104 may be controlled via wireless or wired control devices. For example, media content output by entertainment system 102 to display device 104 may be selected based on input received from a remote control device, computing device (such as a mobile computing device), hand-held game controller, etc. Further, in embodiments elaborated below, one or more aspects of entertainment system 102 and/or display device 104 may be controlled based on natural user input, such as voice or gesture commands performed by a user and interpreted by entertainment system 102 based on image information received from depth camera 106.

FIG. 1 shows a scenario in which depth camera 106 tracks user 108 so that the movements of user 108 may be interpreted by entertainment system 102. In particular, the movements of user 108 are interpreted as controls that can be used to control a virtual pointer 112 displayed on display device 104 as part of scrollable user interface 110. In other words, user 108 may use his movements to control scrolling and/or selection of information presented in scrollable user interface 110. Further, while not shown in FIG. 1, other input devices may also be used to control the location of virtual pointer 112, such as a remote control device or touch-sensitive input device. Additional detail regarding control of scrollable user interface 110 via the location of virtual pointer 112 is presented below with respect to FIGS. 3-4.

Figure 2:
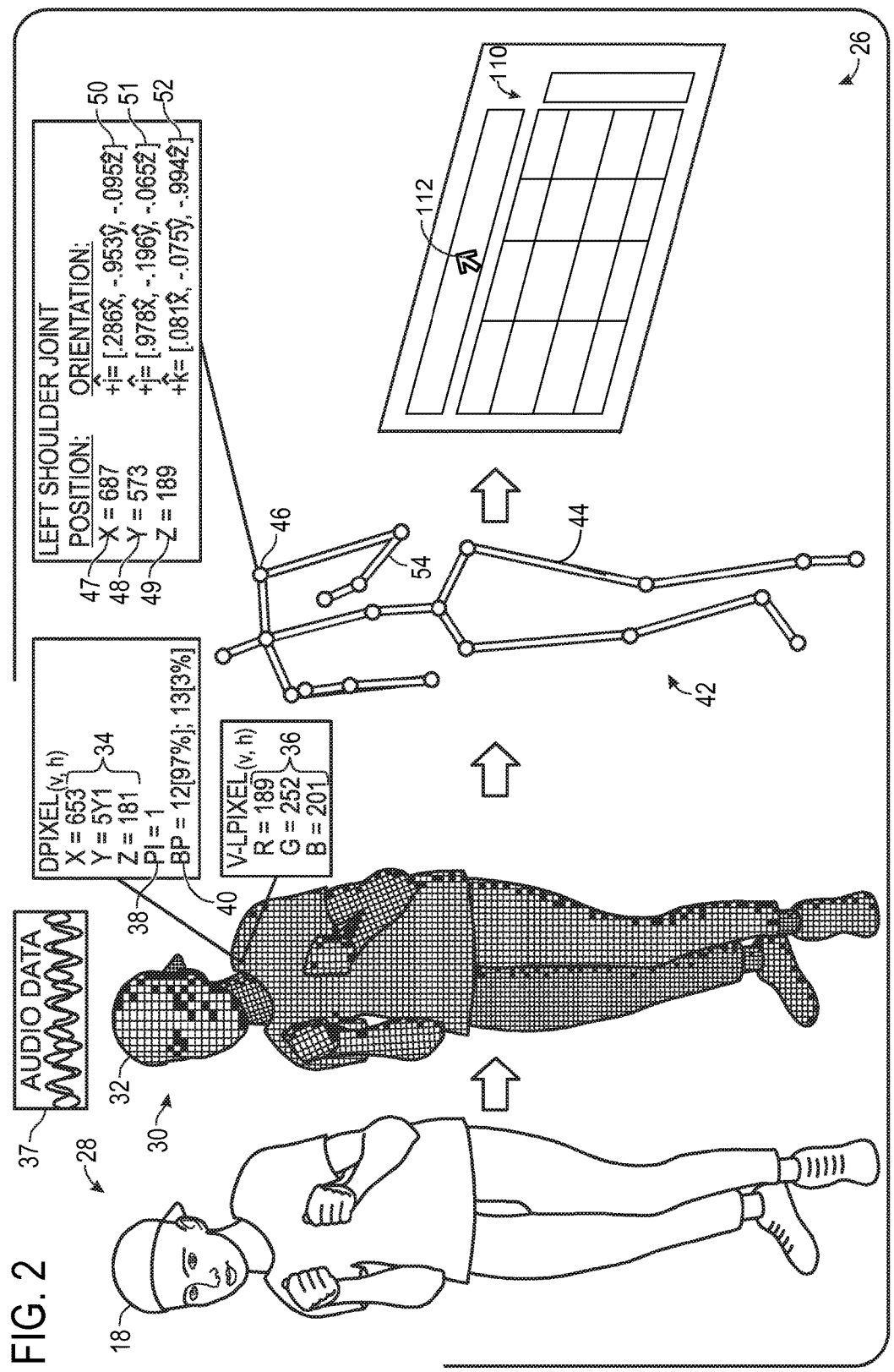
FIG. 2 schematically shows an example of a simplified skeletal tracking pipeline of a depth analysis system.

FIG. 2 graphically shows a simplified skeletal tracking pipeline 26 of a depth analysis system that may be used to track and interpret movements of user 108. For simplicity of explanation, skeletal tracking pipeline 26 is described with reference to entertainment system 102 and depth camera 106 of FIG. 1. However, skeletal tracking pipeline 26 may be implemented on any suitable computing system without departing from the scope of this disclosure. For example, skeletal tracking pipeline 26 may be implemented on computing system 600 of FIG. 6. Furthermore, skeletal tracking pipelines that differ from skeletal tracking pipeline 26 may be used without departing from the scope of this disclosure.

At 28, FIG. 2 shows user 108 from the perspective of a tracking device. The tracking device, such as depth camera 106, may include one or more sensors that are configured to observe a human subject, such as user 108.

At 30, FIG. 2 shows a schematic representation 32 of the observation data collected by a tracking device, such as depth camera 106. The types of observation data collected will vary depending on the number and types of sensors included in the tracking device. In the illustrated example, the tracking device includes a depth camera, a visible light (e.g., color) camera, and a microphone.

The depth camera may determine, for each pixel of the depth camera, the depth of a surface in the observed scene relative to the depth camera. A three-dimensional x/y/z coordinate may be recorded for every pixel of the depth camera. FIG. 2 schematically shows the three-dimensional x/y/z coordinates 34 observed for a DPixel[v,h] of a depth camera. Similar three-dimensional x/y/z coordinates may be recorded for every pixel of the depth camera. The three-dimensional x/y/z coordinates for all of the pixels collectively constitute a depth map. The three-dimensional x/y/z coordinates may be determined in any suitable manner without departing from the scope of this disclosure. Example depth finding technologies are discussed in more detail with reference to FIG. 6.

The visible-light camera may determine, for each pixel of the visible-light camera, the relative light intensity of a surface in the observed scene for one or more light channels (e.g., red, green, blue, grayscale, etc.). FIG. 2 schematically shows the red/green/blue color values 36 observed for a V-LPixel[v,h] of a visible-light camera. Red/green/blue color values may be recorded for every pixel of the visible-light camera. The red/green/blue color values for all of the pixels collectively constitute a digital color image. The red/green/blue color values may be determined in any suitable manner without departing from the scope of this disclosure. Example color imaging technologies are discussed in more detail with reference to FIG. 6.

The depth camera and visible-light camera may have the same resolutions, although this is not required. Whether the cameras have the same or different resolutions, the pixels of the visible-light camera may be registered to the pixels of the depth camera. In this way, both color and depth information may be determined for each portion of an observed scene by considering the registered pixels from the visible light camera and the depth camera (e.g., V-LPixel[v,h] and DPixel [v,h]).

One or more microphones may determine directional and/or non-directional sounds coming from user 108 and/or other sources. FIG. 2 schematically shows audio data 37 recorded by a microphone. Audio data may be recorded by a microphone of depth camera 106. Such audio data may be determined in any suitable manner without departing from the scope of this disclosure. Example sound recording technologies are discussed in more detail with reference to FIG. 6.

The collected data may take the form of virtually any suitable data structure(s), including but not limited to one or more matrices that include a three-dimensional x/y/z coordinate for every pixel imaged by the depth camera, red/green/blue color values for every pixel imaged by the visible-light camera, and/or time resolved digital audio data. User 108 may be continuously observed and modeled (e.g., at 30 frames per second). Accordingly, data may be collected for each such observed frame. The collected data may be made available via one or more Application Programming Interfaces (APIs) and/or further analyzed as described below.

The depth camera 106, entertainment system 102, and/or a remote service optionally may analyze the depth map to distinguish human subjects and/or other targets that are to be tracked from non-target elements in the observed depth map. Each pixel of the depth map may be assigned a user index 38 that identifies that pixel as imaging a particular target or non-target element. As an example, pixels corresponding to a first user can be assigned a user index equal to one, pixels corresponding to a second user can be assigned a user index equal to two, and pixels that do not correspond to a target user can be assigned a user index equal to zero. Such user indices may be determined, assigned, and saved in any suitable manner without departing from the scope of this disclosure.

The depth camera 106, entertainment system 102, and/or remote service optionally may further analyze the pixels of the depth map of user 108 in order to determine what part of the user's body each such pixel is likely to image. A variety of different body-part assignment techniques can be used to assess which part of the user's body a particular pixel is likely to image. Each pixel of the depth map with an appropriate user index may be assigned a body part index 40. The body part index may include a discrete identifier, confidence value, and/or body part probability distribution indicating the body part, or parts, to which that pixel is likely to image. Body part indices may be determined, assigned, and saved in any suitable manner without departing from the scope of this disclosure.

At 42, FIG. 2 shows a schematic representation of a virtual skeleton 44 that serves as a machine-readable representation of user 108. Virtual skeleton 44 includes twenty virtual joints—{head, shoulder center, spine, hip center, right shoulder, right elbow, right wrist, right hand, left shoulder, left elbow, left wrist, left hand, right hip, right knee, right ankle, right foot, left hip, left knee, left ankle, and left foot}. This twenty joint virtual skeleton is provided as a nonlimiting example. Virtual skeletons in accordance with the present disclosure may have virtually any number of joints.

The virtual skeleton may include a suitable number of virtual joints. The various skeletal joints may correspond to actual joints of user 108, centroids of the user's body parts, terminal ends of the user's extremities, and/or points without a direct anatomical link to the user. Each joint may have at least three degrees of freedom (e.g., world space x, y, z). As such, each joint of the virtual skeleton is defined with a three-dimensional position. For example, a left shoulder virtual joint 46 is defined with an x coordinate position 47, a y coordinate position 48, and a z coordinate position 49. The position of the joints may be defined relative to any suitable origin. As one example, the depth camera may serve as the origin, and all joint positions are defined relative to the depth camera. Joints may be defined with a three-dimensional position in any suitable manner without departing from the scope of this disclosure.

A variety of techniques may be used to determine the three-dimensional position of each joint. Skeletal fitting techniques may use depth information, color information, body part information, and/or prior trained anatomical and kinetic information to deduce one or more skeleton(s) that closely model a human subject. As one non-limiting example, the above described body part indices may be used to find a three-dimensional position of each skeletal joint.

A joint orientation may be used to further define one or more of the virtual joints. Whereas joint positions may describe the position of joints and virtual bones that span between joints, joint orientations may describe the orientation of such joints and virtual bones at their respective positions. As an example, the orientation of a wrist joint may be used to describe if a hand located at a given position is facing up or down.

Joint orientations may be encoded, for example, in one or more normalized, three-dimensional orientation vector(s). The orientation vector(s) may provide the orientation of a joint relative to the depth camera or another reference (e.g., another joint). Furthermore, the orientation vector(s) may be defined in terms of a world space coordinate system or another suitable coordinate system (e.g., the coordinate system of another joint). Joint orientations also may be encoded via other means. As non-limiting examples, quaternions and/or Euler angles may be used to encode joint orientations.

FIG. 2 shows a non-limiting example in which left shoulder joint 46 is defined with orthonormal orientation vectors 50, 51, and 52. In other embodiments, a single orientation vector may be used to define a joint orientation. The orientation vector(s) may be calculated in any suitable manner without departing from the scope of this disclosure.

Joint positions, orientations, and/or other information may be encoded in any suitable data structure(s). Furthermore, the position, orientation, and/or other parameters associated with any particular joint may be made available via one or more APIs.

As seen in FIG. 2, virtual skeleton 44 may optionally include a plurality of virtual bones (e.g. a left forearm bone 54). The various skeletal bones may extend from one skeletal joint to another and may correspond to actual bones, limbs, or portions of bones and/or limbs of the user. The joint orientations discussed herein may be applied to these bones. For example, an elbow orientation may be used to define a forearm orientation.

The virtual skeleton may be used to recognize one or more gestures performed by user 108. As a non-limiting example, one or more gestures performed by user 108 may be used to control the position of virtual pointer 112, and the virtual skeleton may be analyzed over one or more frames to determine if the one or more gestures have been performed. For example, a position of a hand joint of the virtual skeleton may be determined, and virtual pointer 112 may be moved based on the position of the hand joint. It is to be understood, however, that a virtual skeleton may be used for additional and/or alternative purposes without departing from the scope of this disclosure.

Figure 3:
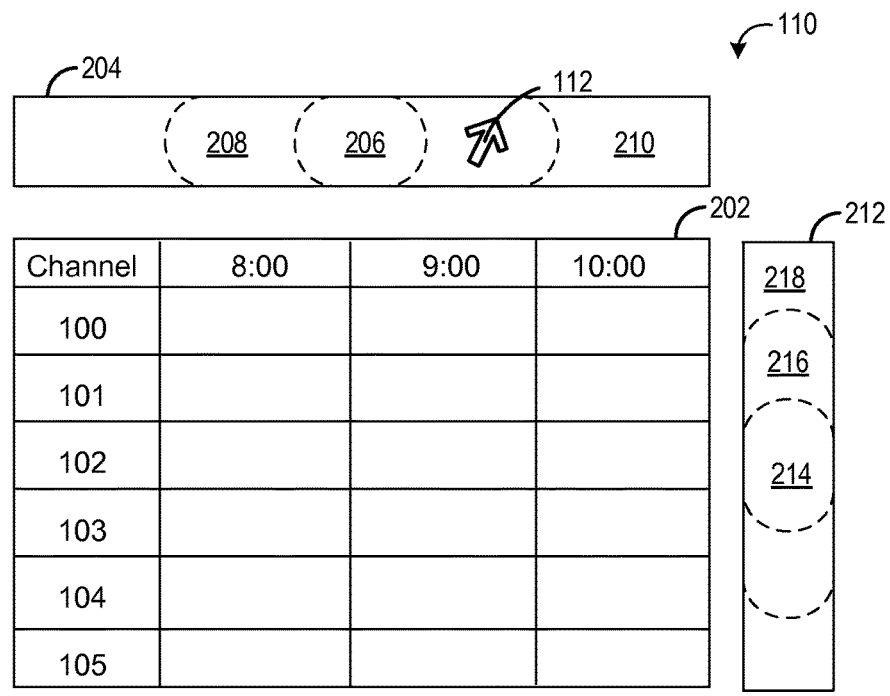
FIGS. 3 and 4 schematically show an example scrollable user interface.
Figure 4:
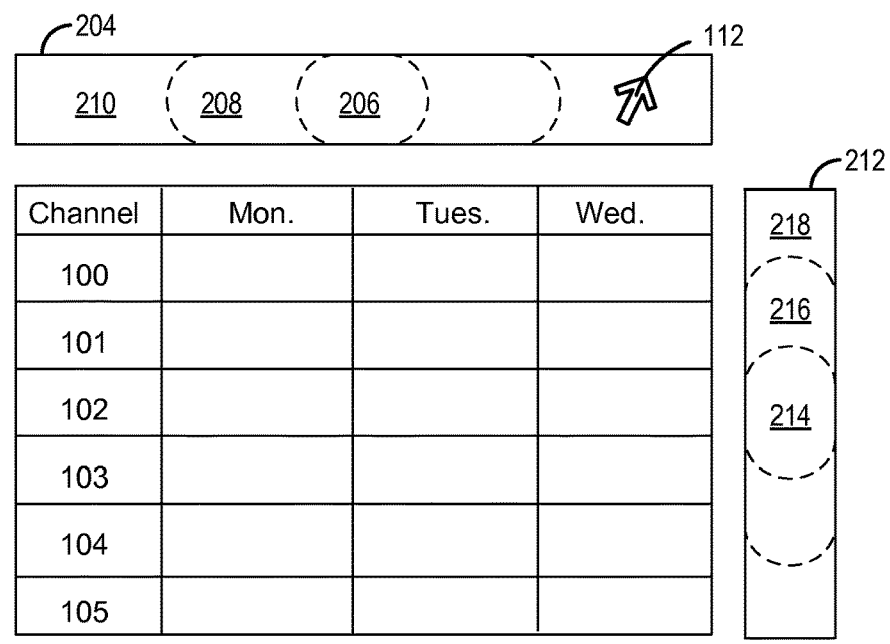

As explained previously, the position of virtual pointer 112 within scrollable user interface 110 may be controlled in order to control the scrolling speed and/or direction of the information presented in scrollable user interface 110. FIGS. 3-4 illustrate example adjustments to scrollable user interface 110 responsive to the position of virtual pointer 112.

Referring to FIG. 3, a first example of scrollable user interface 110 is illustrated. Scrollable user interface 110 may present information to a user via a content area 202. As depicted in FIG. 3, content area 202 includes programming information for a number of media content channels (e.g., television channels) as a function of time, herein illustrated as hourly between the hours of 8:00 and 10:00. The programming information presented in content area 202 may be selectable in order to initiate viewing of a current program, schedule a recording of a future program, and/or view information about a current or future program.

The information presented in content area 202 is non-limiting, and information other than that illustrated in FIG. 3 may be presented. Additional types of content that may be presented in content area 202 include photographs stored in an album, music from a library, contacts from a contact list, etc. Further, while the information in content area 202 is presented in a grid-like format in FIG. 3, other content formats are within the scope of this disclosure.

In order to display information not currently presented in content area 202, scrollable user interface 110 may be configured to scroll in a horizontal direction (e.g., left to right and right to left) and/or in a vertical direction (e.g., top to bottom and bottom to top). Thus, additional time outside the window presented in content area 202 may be viewed, as well as additional channels. To control the scrolling of scrollable user interface 110, virtual pointer 112 may be placed in a scroll control target. The scroll control target may be a dedicated area of scrollable user interface 110 that is fixed in place, regardless of whether or not scrollable user interface 110 is being scrolled. The scroll control target may be in the shape of a rectilinear polygon or other suitable shape. Depending on the position of virtual pointer 112 within a scroll control target, scrollable user interface 110 may begin to scroll, stop scrolling, change a scrolling speed, or change a scrolling direction.

As shown in FIG. 3, a first scroll control target 204 extends across the top of scrollable user interface 110 in a horizontal direction. However, first scroll control target may be positioned in other suitable locations on scrollable user interface 110, such as across the bottom. In some embodiments, first scroll control target 204 may extend substantially across an entirety of scrollable user interface 110, while in other embodiments, first scroll control target 204 may extend only partially across scrollable user interface 110. In some implementations, the scrollable user interface itself may serve as a scroll control target responsive to a mode change from a viewing mode to a scrolling mode. For example, voice commands and/or gestures may be used to signal a change from the viewing mode to the scrolling mode. Once in the scrolling mode, chevrons or other visual indicators may be displayed to indicate operation in the scrolling mode, and/or to indicate if scrolling is occurring in the horizontal or vertical direction. The scrolling may then be controlled based on a distance of the virtual pointer relative to the center of the scroll control target (e.g., the scrollable user interface). In some scenarios, the virtual pointer may disappear while in the scrolling mode.

The position of virtual pointer 112 within first scroll control target 204 may control the scrolling of scrollable user interface 110. However, unlike typical user interface scroll bars, which require an additional user input to initiate scrolling (such as clicking of a mouse), the mere presence of virtual pointer 112 within first scroll control target 204 may control various aspects of scrollable user interface 110. That is, control of scrollable user interface 110 may be provided simply by the location of virtual pointer 112, and does not rely on additional user input to first scroll control target 204.

When virtual pointer 112 is positioned within first scroll control target 204, scrollable user interface 110 may scroll in the horizontal direction, such that additional time slots are displayed in content area 202. First scroll control target 204 may include a center point or center region 206. When virtual pointer 112 is positioned in center region 206, scrolling of scrollable user interface 110 may freeze, so that the information displayed in content area 202 remains fixed.

First scroll control target 204 also includes a first region 208 and a second region 210. First region 208 may be positioned proximate to center region 206, and second region 210 may be positioned on an opposite side of first region 208 from center region 206. Thus, first region 208 may be closer to the center point of first scroll control target 204 than second region 210. Further, as shown in FIG. 3, first region 208 may substantially surround center region 206, such that first region is located both the left and to the right of center region. Similarly, second region 210 may surround first region 208.

When virtual pointer 112 is moved to first region 208, scrollable user interface 110 may begin to scroll at a first speed. When virtual pointer 112 is moved to second region 210, scrollable user interface 110 may begin to scroll at a second speed, different than the first. In this way, depending on the position of the virtual pointer within a scroll control target, scrollable user interface 110 may be controlled to scroll at a desired speed.

If virtual pointer 112 is moved to first region 208 or second region 210 on a right-hand side of center region 206, scrollable user interface 110 may be scrolled in a first horizontal direction, such as right to left. If virtual pointer is moved to first region 208 or second region 210 on a left-hand side of center region 206, scrollable user interface 110 may be scrolled in a second horizontal direction, such as left to right. Thus, depending on the position of the virtual pointer within a scroll control target, scrollable user interface 110 may be controlled to scroll in a desired direction.

To further control the direction of scrolling of scrollable user interface 110, a second scroll control target 212 may extend across a side portion of scrollable user interface 110 in a vertical direction. Second scroll control target 212 may extend substantially across an entirety of a side portion of scrollable user interface 110, or may extend only partially across a side portion of scrollable user interface 110. Further, second scroll control target 212 may be located in virtually any position on scrollable user interface 110.

When virtual pointer 112 is positioned within second scroll control target 212, scrollable user interface 110 may scroll in the vertical direction, such that additional channels are displayed in content area 202. Similar to first scroll control target 204, second scroll control target 212 may include a center point or center region 214, first region 216, and second region 218. When virtual pointer 112 is positioned in center region 214, scrolling of scrollable user interface 110 may freeze, so that the information displayed in content area 202 remains fixed. When virtual pointer 112 is positioned in first region 216 or second region 218, scrollable user interface 110 may scroll in the vertical direction, at either a first speed (if positioned in the first region) or a second speed (if positioned in the second region). Further, when virtual pointer 112 is positioned above center region 214, scrollable user interface 110 may be scrolled in a first vertical direction (such as in an upward direction), and when virtual pointer 112 is positioned below center region 214, scrollable user interface 110 may be scrolled in a second vertical direction (such as in a downward direction).

While FIG. 3 depicts first and second scroll control targets as including a center region, first region, and second region, with freezing of scrolling occurring responsive to the virtual pointer being moved to the center region. Scrolling may be additionally or alternatively frozen if the virtual pointer is moved outside the scroll control target. Further, other speed control regions within the scroll control targets are possible. For example, the scroll control targets may include a center region and three, four, or five speed control regions. Additionally, the center region and additional speed control regions may be visually indicated in the scroll control targets, or the center region and additional speed control regions may not be visually indicated in the scroll control targets.

In another example, the scroll control targets may not include defined regions with fixed boundaries, but may instead include a speed gradient. The speed gradient may include a center area that causes scrolling to freeze. Then, as the virtual pointer is moved away from the center of the scroll control target, the scrolling speed of the scrollable user interface may increase. The increase of the scrolling speed may be a function of a distance of the virtual pointer from the center of the scroll control target. For example, the speed of the scrolling may increase linearly as the distance of the virtual pointer from the center increases. As another example, the speed may change as a nonlinear function of pointer position. In one non-limiting example, the first and second regions of the scroll control targets, explained above, may be positions along the speed gradient rather than the defined areas described above. Further, to avoid rapid transitions between different speeds, hysteresis may be applied to boundaries between different speeds.

FIG. 3 illustrates virtual pointer 112 as being positioned within first region 208 of first scroll control target 204. Thus, scrollable user interface 110 may be scrolled in the horizontal direction at a first speed. In some embodiments, when the virtual pointer is in the first region of a scroll control target, scrollable user interface 110 may be displayed in a first view. The first view may be a zoomed-in view, wherein the information displayed in content area 202 is presented at a first scale. For example, in the zoomed-in view presented in FIG. 3, the scheduled programming for each channel may be presented for each hour of the day. This zoomed-in view may provide information at a high level of detail. However, this high level of detail includes the display of a relatively large amount of information. If a user wishes to scroll ahead to view scheduled programming information for the next day or the next week, the scroll process may be lengthy and frustrate the user. Thus, in some embodiments, the magnitude of the information presented in scrollable user interface 110 may be adjusted based on a position of virtual pointer 112, as explained in more detail below.

FIG. 4 illustrates scrollable user interface 110 with virtual pointer 112 positioned in second region 210 of first scroll control target 204. Thus, scrollable user interface 110 may be controlled to scroll at a second speed in the horizontal direction. In some embodiments, this second speed may be faster than the first speed. Additionally, when the virtual pointer is in the second region of a scroll control target, scrollable user interface 110 optionally may be displayed in a second view. The second view may be a zoomed-out view where the information displayed in content area 202 is presented at a second scale. For example, in the zoomed-out view presented in FIG. 4, the time information along the top of content area 202 may be presented in days, rather than the hours illustrated in the zoomed-in view of FIG. 3. This may provide less-detailed information to a user. By providing a less-detailed view, the user may be able to quickly scroll through the presented information.

When scrollable user interface 110 is presented in the first, zoomed-in view, if the user stops scrolling (by moving the virtual pointer to the center of a scroll control target or out of the scroll control target entirely, for example), the information displayed in content area 202 will remain the same as the information displayed while scrolling. However, when scrollable user interface 110 is presented in the second, zoomed-out view, if the user stops scrolling, an animated transition may occur to return the information displayed in content area 202 back to the zoomed-in view. Thus, while scrolling in the zoomed-out view, the information presented in scrollable user interface 110 may be different than when scrollable user interface 110 is frozen. Further, when in the zoomed-out view, scheduled programming information may not be presented in content area 202, and only the channel number and days may be presented.

While FIGS. 3 and 4 illustrate scrollable user interface 110 in a first view and a second view of different magnitude, other views are possible. For example, scrollable user interface 110 may be presented in three or more views of different magnitude. Further, in some examples each view may be scrolled at one speed, while in other examples, each view may be scrolled at more than one speed.

Figure 5:
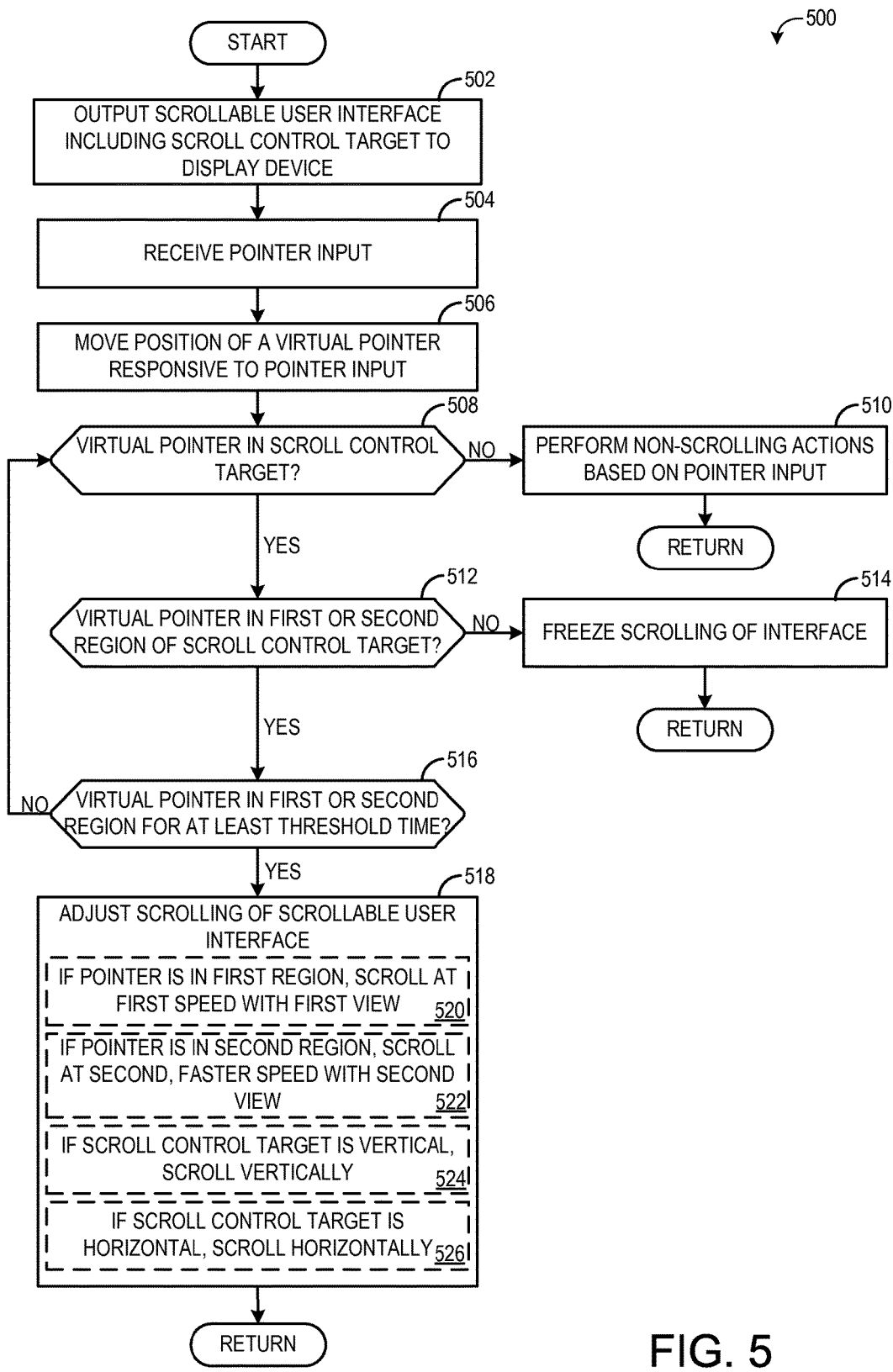
FIG. 5 is a flow chart illustrating a method for navigating a scrollable user interface according to an embodiment of the present disclosure.

Turning now to FIG. 5, a method 500 for navigating a scrollable user interface is presented. Method 500 may adjust a speed, direction, and/or view of a scrollable user interface presented to a user. By doing so, the user may be able to efficiently move through the information presented in the scrollable user interface. Method 500 may be carried out by a computing device configured to control a scrollable user interface, such as entertainment system 102.

At 502, method 500 includes outputting to a display device a scrollable user interface including a scroll control target. The display device (such as display device 104) may be separate from the computing device, or may be integrated in the computing device. As explained previously, the scrollable user interface may display suitable information to a user, such as television programming information. Further, the scrollable user interface may only present a subset of information in a viewable content area at one time, and thus a user may scroll through the presented information to reach a desired portion of the scrollable user interface. The scroll control target may include a defined region of the scrollable user interface having at least center, first, and second regions. The scrollable user interface may be configured to adjust a scrolling speed, view, and/or direction based on a position of a virtual pointer relative to the scroll control target.

At 504, pointer input is received. The pointer input may comprise a suitable user input that the computing device may use to adjust a position of a virtual pointer displayed on the scrollable user interface. As explained in more detail below, the scrollable user interface may be adjusted responsive to a position of the virtual pointer. In one example, the pointer input may include a command received from a remote control device. In another example, the pointer input may include a virtual skeleton derived from one or more depth images captured via a depth camera, such as depth camera 106. As explained previously, the virtual skeleton may include a hand joint, and the position of the virtual hand joint may serve as the input. In a still further example, the pointer input may include a voice command issued by the user, or may include a command from a touch-sensitive device, mobile computing device, hand-held game controller, or other suitable input mechanism.

At 506, method 500 includes moving a position of the virtual pointer on the scrollable user interface responsive to the pointer input. At 508, method 500 determines whether the virtual pointer is positioned in the scroll control target. If the virtual pointer is not positioned within the scroll control target, method 500 proceeds to 510 to perform non-scrolling actions based on the pointer input. This may include selection of information displayed in the scrollable user interface, or other suitable actions. Method 500 then returns.

If method 500 determines at 508 that the virtual pointer is in the scroll control target, method 500 proceeds to 512 to determine if the virtual pointer is in the first or second region of the scroll control target. If the virtual pointer is not positioned in the first or second region, it is therefore positioned in the center region, and method 500 proceeds to 514 to freeze the scrolling of the scrollable user interface. Method 500 then returns.

If the virtual pointer is within the first or second region, method 500 proceeds to 516 to determine if the virtual pointer has been positioned in the first or second region for at least a threshold duration. Before adjusting the scrolling of the scrollable user interface, an intent of the user to actually adjust the scrolling of the interface may be determined. If the user quickly moves the virtual pointer across the first or second region, he or she may not intend to adjust the scrolling of the interface. However, if the pointer is positioned in the first or second region for a threshold amount of time (such as one second), it may be determined that the user intended to adjust the scrolling of the interface. The threshold duration may be set to a user preference, with longer durations limiting relatively more unintentional scrolling, and shorter durations providing a more responsive feel. As a non-limiting example, the threshold duration may be 0.25 seconds.

Thus, if it is determined at 516 that the virtual pointer has not been in the first or second region for at least the threshold duration, method 500 loops back to 508 to continue to monitor if the virtual pointer is in the scroll control target. If it is determined at 516 that the virtual pointer has been positioned in the first or second region for at least the threshold duration, method 500 proceeds to 518 to adjust the scrolling of the scrollable user interface.

The scrolling of the scrollable user interface may be adjusted in a suitable manner depending on the position of the virtual pointer. As indicated at 520, if the virtual pointer is in the first region of the scroll control target, the interface may be scrolled at a first speed. Further, when the pointer is in the first region, the scrollable user interface may be displayed at a first view. As indicated at 522, if the pointer is in the second region, the interface may be scrolled a second speed. The second speed may be faster than the first speed, or other suitable relationship relative to the first speed. Additionally, when the pointer is in the second region, the scrollable user interface may be presented in a second view. The second view may be a less-detailed view than the first view. For example, the scrollable user interface may be configured to present information as a function of a unit, such as time. This unit may be a first magnitude in the first view and a second magnitude in the second view. The scrollable user interface may adjust the visual indication of the magnitude of the unit when switching between the first and second views. As explained previously with respect to FIGS. 3 and 4, the scrollable user interface may present time in hours in a first view and present time in days in a second view.

The direction of scrolling of the scrollable user interface may also be adjusted. As indicated at 524, if the virtual pointer is positioned in a vertical scroll control target, the interface may be controlled to scroll vertically. As indicated at 526, if the virtual pointer is positioned in a horizontal scroll control target, the interface may be controlled to scroll horizontally. Further, the position of the virtual pointer relative to the center of the scroll control target may also dictate the direction of scrolling. For example, if the virtual pointer is to the left of center in a horizontal scroll control target, the interface may be controlled to scroll in a left-to-right direction.

Thus, method 500 described above provides for adjusting various aspects of the scrolling of a scrollable user interface responsive to a position of a virtual pointer within a scroll control target. In order to reduce unnecessary or unwanted scrolling, scrolling may be delayed until the virtual pointer has resided in a particular region of the scroll control target for a threshold amount of time. Additionally, to reduce jarring transitions to faster scrolling speeds, a ramp-up time may be used to slowly ramp up the speed of the scrolling. For example, when transitioning from the center region or first region to the second region, the interface may not immediately start scrolling at the second speed, but may instead slowly increase in speed until the second speed is reached.

Further, when scrolling at fast speeds, it may be difficult for a user to time the stopping of scrolling at a desired position. For example, by the time the user has indicated he or she wishes to stop scrolling, the desired portion of the scrollable user interface may no longer be displayed. To increase the accuracy of arriving at a desired portion of the scrollable user interface, a semantic view of the scrollable user interface may be provided at higher scrolling speeds. For example, at lower scrolling speeds, the information may be presented in a more-detailed, zoomed-in view. Then, at higher scrolling speeds, the information may be presented in a less-detailed, zoomed-out view.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
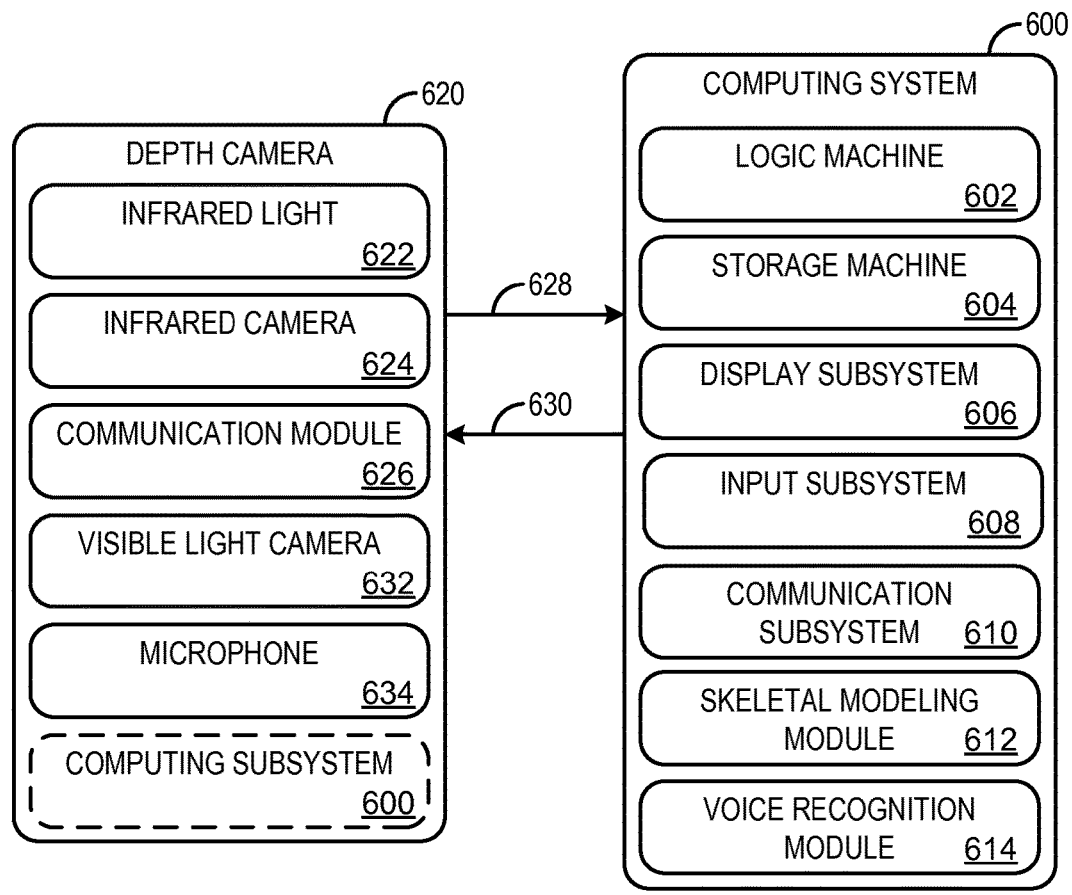
FIG. 6 schematically shows a non-limiting example of a computing system for providing a scrollable user interface in accordance with the present disclosure.

FIG. 6 schematically shows a non-limiting embodiment of a computing system 600 that can enact one or more of the methods and processes described above. Entertainment system 102 may be a non-limiting example of computing system 600. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Further, computing system 600 may include a skeletal modeling module 612 configured to receive imaging information from a depth camera 620 (described below) and identify and/or interpret one or more postures and gestures performed by a user. Computing system 600 may also include a voice recognition module 614 to identify and/or interpret one or more voice commands issued by the user detected via a microphone (coupled to computing system 600 or the depth camera). While skeletal modeling module 612 and voice recognition module 614 are depicted as being integrated within computing system 600, in some embodiments, one or both of the modules may instead be included in the depth camera 620.

Computing system 600 may be operatively coupled to the depth camera 620. Depth camera 620 may include an infrared light 622 and a depth camera 624 (also referred to as an infrared light camera) configured to acquire video of a scene including one or more human subjects. The video may comprise a time-resolved sequence of images of spatial resolution and frame rate suitable for the purposes set forth herein. As described above with reference to FIGS. 1 and 2, the depth camera and/or a cooperating computing system (e.g., computing system 600) may be configured to process the acquired video to identify one or more postures and/or gestures of the user and to interpret such postures and/or gestures as device commands configured to control various aspects of computing system 600, such as scrolling of a scrollable user interface.

Depth camera 620 may include a communication module 626 configured to communicatively couple depth camera 620 with one or more other computing devices. Communication module 626 may include wired and/or wireless communication devices compatible with one or more different communication protocols. In one embodiment, the communication module 626 may include an imaging interface 628 to send imaging information (such as the acquired video) to computing system 600. Additionally or alternatively, the communication module 626 may include a control interface 630 to receive instructions from computing system 600. The control and imaging interfaces may be provided as separate interfaces, or they may be the same interface. In one example, control interface 630 and imaging interface 628 may include a universal serial bus.

The nature and number of cameras may differ in various depth cameras consistent with the scope of this disclosure. In general, one or more cameras may be configured to provide video from which a time-resolved sequence of three-dimensional depth maps is obtained via downstream processing. As used herein, the term 'depth map' refers to an array of pixels registered to corresponding regions of an imaged scene, with a depth value of each pixel indicating the depth of the surface imaged by that pixel. 'Depth' is defined as a coordinate parallel to the optical axis of the depth camera, which increases with increasing distance from the depth camera.

In some embodiments, depth camera 620 may include right and left stereoscopic cameras. Time-resolved images from both cameras may be registered to each other and combined to yield depth-resolved video.

In some embodiments, a "structured light" depth camera may be configured to project a structured infrared illumination comprising numerous, discrete features (e.g., lines or dots). A camera may be configured to image the structured illumination reflected from the scene. Based on the spacings between adjacent features in the various regions of the imaged scene, a depth map of the scene may be constructed.

In some embodiments, a "time-of-flight" depth camera may include a light source configured to project a pulsed infrared illumination onto a scene. Two cameras may be configured to detect the pulsed illumination reflected from the scene. The cameras may include an electronic shutter synchronized to the pulsed illumination, but the integration times for the cameras may differ, such that a pixel-resolved time-of-flight of the pulsed illumination, from the light source to the scene and then to the cameras, is discernible from the relative amounts of light received in corresponding pixels of the two cameras.

Depth camera 620 may include a visible light camera 632 (e.g., color). Time-resolved images from color and depth cameras may be registered to each other and combined to yield depth-resolved color video. Depth camera 620 and/or computing system 600 may further include one or more microphones 634.

While depth camera 620 and computing system 600 are depicted in FIG. 6 as being separate devices, in some embodiments depth camera 620 and computing system 600 may be included in a single device. Thus, depth camera 620 may optionally include computing system 600.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for navigating a scrollable user interface, comprising:

outputting to a display device having a first edge, a second edge, and a center between the first edge and the second edge, a scrollable user interface including a first region fixed in a first dedicated area of the scrollable user interface, a second region fixed in a second dedicated area of the scrollable user interface, and a center region fixed between the first region and the second region in a third dedicated area of the scrollable user interface, wherein the first edge is closer to the first region than the second region, wherein the second edge is closer to the second region than the first region, the scrollable user interface configured to present selectable information and including a content area displaying a selected subset of the selectable information;

responsive to a command to switch from a viewing mode of the scrollable user interface to a scrolling mode of the scrollable user interface, setting an entirety of the content area as a scroll control target;

responsive to a visible pointer being displayed at a first position within the first region of the content area for at least a first threshold duration and without receiving additional pointer input, scrolling the scrollable user interface towards the first edge;

receiving a virtual skeleton modeled from a depth map, the virtual skeleton including a hand joint;

moving the visible pointer from the first position to a second position in the scrollable user interface responsive to a position of the hand joint of the virtual skeleton;

responsive to the visible pointer being displayed at the second position within the second region of the content area for at least a second threshold duration and without receiving additional pointer input, scrolling the scrollable user interface towards the second edge; and responsive to the visible pointer being displayed within the center region, freezing scrolling of the scrollable user interface.

2. The method of claim 1, wherein fixed boundaries of the first region and the second region are visually indicated on the scrollable user interface.

3. The method of claim 1, wherein, in the first region, a speed at which the scrollable user interface is scrolled increases as a distance measured from the visible pointer to the center increases.

4. The method of claim 1, wherein scrolling the scrollable user interface towards the first edge comprises scrolling the scrollable user interface in a leftward direction, and wherein scrolling the scrollable user interface towards the second edge comprises scrolling the scrollable user interface in a rightward direction.

5. The method of claim 1, wherein the first region, the second region, and the center region collectively constitute a horizontal control target, wherein the center region is a first center region, and wherein the scrollable user interface further includes a vertical control target comprising a third region fixed in a fourth dedicated area of the scrollable user interface, a fourth region fixed in a fifth dedicated area of the scrollable user interface, and a second center region between the third region and the fourth region.

6. The method of claim 5, further comprising:

responsive to the visible pointer being displayed within the third region of the vertical control target and without receiving additional pointer input, scrolling the scrollable user interface towards a third edge of the display device;

responsive to the visible pointer being displayed within the fourth region of the vertical control target and without receiving additional pointer input, scrolling the scrollable user interface towards a fourth edge of the display device; and responsive to the visible pointer being displayed within the second center region of the vertical control target, freezing scrolling of the scrollable user interface.

7. The method of claim 6, wherein scrolling the scrollable user interface towards the third edge comprises scrolling the scrollable user interface in an upward direction, and wherein scrolling the scrollable user interface towards the fourth edge comprises scrolling the scrollable user interface in a downward direction.

8. A method for navigating a scrollable user interface, comprising:

outputting to a display device having a first edge, a second edge, and a center between the first edge and the second edge, a scrollable user interface including a scroll-control target having a first region fixed in a first dedicated area of the scroll-control target, a second region fixed in a second dedicated area of the scroll-control target and separated from the first region by a displayed fixed boundary, and a center region fixed between the first region and the second region in a dedicated center area of the scroll-control target;

receiving a virtual skeleton modeled from a depth map, the virtual skeleton including a hand joint;

displaying a visible pointer at a first position in the scrollable user interface;

moving the visible pointer from the first position to a second position in the scrollable user interface responsive to a position of the hand joint of the virtual skeleton;

responsive to the visible pointer being displayed on a first side of the displayed fixed boundary within the first region of the scroll-control target and without receiving additional pointer input, scrolling the scrollable user interface at a first speed with a first, zoomed-in view towards the first edge;

responsive to the visible pointer being displayed on a second side of the displayed fixed boundary, opposite the first side, within the second region of the scroll-control target and without receiving additional pointer input, scrolling the scrollable user interface at a second speed with a second, zoomed-out view towards the second edge, the second speed being faster than the first speed; and responsive to the visible pointer being displayed within the center region, freezing scrolling of the scrollable user interface.

9. The method of claim 8, wherein scrolling the scrollable user interface towards the first edge includes scrolling the scrollable user interface in one constrained dimension perpendicular to the first edge.

10. The method of claim 8, wherein, in the first region, the first speed at which the scrollable user interface is scrolled is determined based on a distance measured from the visible pointer to the center.

11. The method of claim 8, wherein scrolling the scrollable user interface towards the first edge comprises scrolling the scrollable user interface in a leftward direction, and wherein scrolling the scrollable user interface towards the second edge comprises scrolling the scrollable user interface in a rightward direction.

12. The method of claim 8, wherein the first region and the second region collectively constitute a horizontal control target, and wherein the scrollable user interface further includes a vertical control target comprising a third region fixed in a third dedicated area of the scroll-control target, and a fourth region fixed in a fourth dedicated area of the scroll-control target.

13. The method of claim 12, further comprising:

responsive to the visible pointer being displayed within the third region of the vertical control target and without receiving additional pointer input, scrolling the scrollable user interface towards a third edge of the display device; and responsive to the visible pointer being displayed within the fourth region of the vertical control target and without receiving additional pointer input, scrolling the scrollable user interface towards a fourth edge of the display device.

14. The method of claim 13, wherein scrolling the scrollable user interface towards the third edge comprises scrolling the scrollable user interface in an upward direction, and wherein scrolling the scrollable user interface towards the fourth edge comprises scrolling the scrollable user interface in a downward direction.

15. A computing device, comprising:

a logic machine; and a storage machine comprising instructions executable by the logic machine to:

output to a display device having a first edge, a second edge, and a center between the first edge and the second edge, a scrollable user interface including a first region fixed in a first dedicated area of the scrollable user interface, a second region fixed in a second dedicated area of the scrollable user interface, and a center region fixed between the first region and the second region in a third dedicated area of the scrollable user interface, wherein the first edge is closer to the first region than the second region, wherein the second edge is closer to the second region than the first region, the scrollable user interface configured to present selectable information and including a content area displaying a selected subset of the selectable information;

responsive to a command to switch from a viewing mode of the scrollable user interface to a scrolling mode of the scrollable user interface, set an entirety of the content area as a scroll control target;

responsive to a visible pointer being displayed at a first position within the first region of the content area for at least a first threshold duration and without receiving additional pointer input, scroll the scrollable user interface towards the first edge;

receive a virtual skeleton modeled from a depth map, the virtual skeleton including a hand joint;

move the visible pointer from the first position to a second position in the scrollable user interface responsive to a position of the hand joint of the virtual skeleton;

responsive to the visible pointer being displayed at the second position within the second region of the content area for at least a second threshold duration and without receiving additional pointer input, scroll the scrollable user interface towards the second edge; and responsive to the visible pointer being displayed within the center region, freeze scrolling of the scrollable user interface.

16. The computing device of claim 15, wherein fixed boundaries of the first region and the second region are visually indicated on the scrollable user interface.

17. The computing device of claim 15, wherein, in the first region, a speed at which the scrollable user interface is scrolled increases as a distance measured from the visible pointer to the center increases.

18. The computing device of claim 15, wherein scrolling the scrollable user interface towards the first edge comprises scrolling the scrollable user interface in a leftward direction, and wherein scrolling the scrollable user interface towards the second edge comprises scrolling the scrollable user interface in a rightward direction.

19. The computing device of claim 15, wherein the first region, the second region, and the center region collectively constitute a horizontal control target, wherein the center region is a first center region, and wherein the scrollable user interface further includes a vertical control target comprising a third region fixed in a fourth dedicated area of the scrollable user interface, a fourth region fixed in a fifth dedicated area of the scrollable user interface, and a second center region between the third region and the fourth region.

20. The computing device of claim 19, further comprising instructions executable to:

responsive to the visible pointer being displayed within the third region of the vertical control target and without receiving additional pointer input, scroll the scrollable user interface towards a third edge of the display device;

responsive to the visible pointer being displayed within the fourth region of the vertical control target and without receiving additional pointer input, scroll the scrollable user interface towards a fourth edge of the display device; and responsive to the visible pointer being displayed within the second center region of the vertical control target, freeze scrolling of the scrollable user interface.

\* \* \* \* \*